United States Patent

[11] 3,619,660

[72] Inventor John James Rugo
Middletown, N.J.

[21] Appl. No. 28,441
[22] Filed Apr. 14, 1970
[45] Patented Nov. 9, 1971

[73] Assignee Bell Telephone Laboratories, Inc.
Murray Hill, Berkeley Heights, N.J.

[54] AUTOMATIC GAIN CONTROL UTILIZING CONTROLLED SAMPLING

9 Claims, 7 Drawing Figs.

[52] U.S. Cl. .......... 307/264, 328/171, 328/175, 330/29, 330/141
[51] Int. Cl. .......... H03k 1/14, H03g 3/30, H03g 3/20
[50] Field of Search .......... 307/261, 264, 268; 328/31, 171, 172, 175; 330/29, 138, 141

[56] References Cited

UNITED STATES PATENTS

| | | | |
|---|---|---|---|
| 3,050,692 | 8/1962 | Willard | 330/141 X |
| 3,206,689 | 9/1965 | Santana | 307/264 X |

*Primary Examiner*—Donald D. Forrer
*Assistant Examiner*—John Zazworsky
*Attorneys*—R. J. Guenther and William L. Keefauver

ABSTRACT: Automatic gain control for burst signals is achieved by converting a burst signal into a pulsating signal having a duty cycle proportional to the amplitude of the burst signal, and by integrating the pulse signal to obtain a direct current control voltage. To prevent unwanted variations in the control voltage during no-signal intervals, adjustment of the control voltage amplitude takes place on a cycle-by-cycle basis of the burst signal by providing a discharge path for the integrator circuit for a predetermined interval only after each pulse of the pulsating signal.

INVENTOR
J. J. RUGO
BY G. E. Hirsch Jr.
ATTORNEY

AUTOMATIC GAIN CONTROL UTILIZING CONTROLLED SAMPLING

This invention relates generally to control systems, and more specifically, to automatic gain control circuits for pulse burst signal systems.

BACKGROUND OF THE INVENTION

In many systems, signal levels must be maintained at substantially a constant amplitude. Accordingly, automatic gain control (AGC) circuits are employed. In a typical AGC circuit, an alternating current signal to be stabilized in amplitude is supplied to an amplifier having controllable gain capability. The output from the amplifier is rectified and then filtered to obtain a direct current control voltage. The control voltage, in turn, is supplied to the amplifier for controlling automatically the signal amplitude. Sensitivity of such circuits is improved by utilizing a so-called bistable voltage comparator which generates a unidirectional pulsating signal having a duty cycle proportional to the amplitude of the AC signal. The pulsating signal is supplied to an integrator circuit where the desired DC control voltage is developed. Although such AGC circuits perform satisfactorily in many applications, they are unsatisfactory in others.

AGC errors are experienced in systems which utilize signals having relatively long "no-signal" intervals. For example, errors are known to occur in systems which utilize pulse signals, burst signals and the like because of unwanted changes in the gain control voltage during the intervals when no signal is present, i.e., between pulses or bursts. Ordinarily, such errors are caused by the discharge, during the no-signal intervals, of a capacitor used to integrate or otherwise filter the pulsating signal. This causes a change in the control voltage which creates an illusion of low signal amplitude. Consequently, the circuit gain is increased which, in turn, causes an increase in the amplitude of the next received signal. Such an increase in signal amplitude may cause unwanted effects. For example, amplifiers to which the signal is applied may be driven into saturation, thereby distorting the signal.

In many systems, the pulse and burst signals are passed through filters to eliminate noise and other unwanted signal components. Such filtering distorts the leading and trailing edges of the signals. Ordinarily, the leading edge of the signal is caused to rise exponentially and the trailing is caused to fall exponentially. Thus, during the "rise" and "fall" intervals, the signal appears to have a "low" amplitude. Accordingly, precautions must be taken in such systems to eliminate use of the signal during rise and fall intervals for gain control purposes. Otherwise, errors may result. For example, if an amplitude sample was taken during either of these intervals, a "low" amplitude would be detected and the circuit gain would be increased. Such an increase in gain causes a corresponding increase in the amplitude of the next received pulse or burst signal. Again this may cause the signal to be distorted and result in errors in information extracted from the signal.

SUMMARY OF THE INVENTION

These and other problems are resolved in a pulse burst signal automatic gain control circuit by selectively controlling the discharge of a storage device across which a DC gain control voltage is developed. In accordance with the invention, a discharge path is supplied to the storage device for a predetermined interval only after the termination of each of the pulse signals supplied to the storage device. Thus, a path through which the storage device may discharge is available only during a part of the no-signal interval. Therefore, unwanted variations in the control voltage, caused by uncontrolled discharge of the storage device are eliminated.

More specifically, pulse burst signals to be stabilized in amplitude are supplied to an amplifier or other device having controllable gain capability. The output signal from the amplifier is supplied to a trigger circuit having a predetermined threshold level for converting the burst signal to a plurality of unidirectional pulses having a duty cycle proportional to the amplitude of the burst signal. The pulses are supplied via a unidirectional conducting device and a resistor to a capacitor across which the desired DC control voltage is developed. The pulsating signal is also supplied to a control circuit which adjusts the level of the signal developed across the capacitor on a cycle-by-cycle basis of the burst signal. The control circuit includes a monostable multivibrator which supplies a discharge path having a predetermined time constant for a predetermined interval only after each pulse supplied from the trigger circuit.

These and other objects and advantages will be more fully understood from the following detailed description of an illustrative embodiment thereof taken in connection with the appended drawings.

BRIEF DESCRIPTION

DETAILED DESCRIPTION

Figure 1:
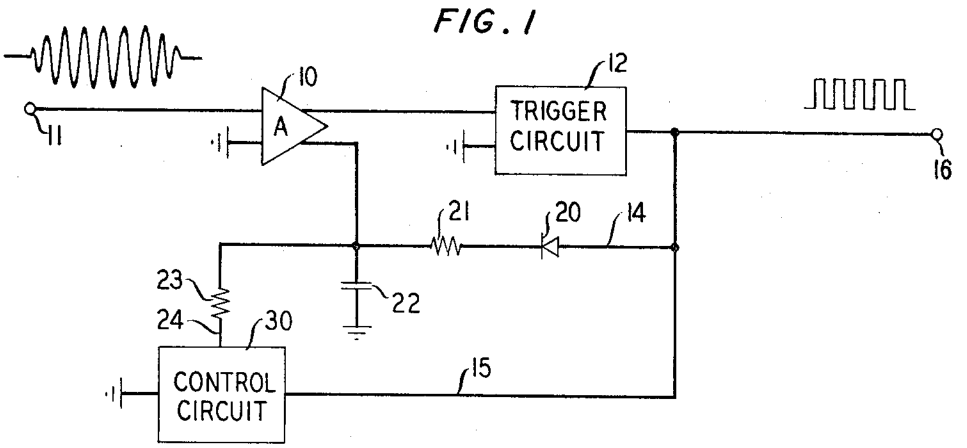
FIG. 1 is a simplified schematic diagram of an automatic gain control circuit illustrating the invention.
Figure 2:
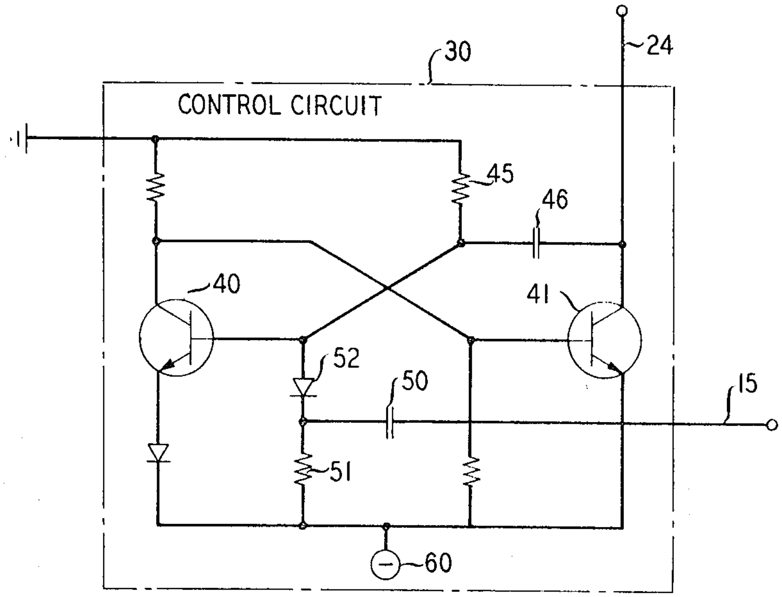
FIG. 2 shows details of the control circuit used in the automatic gain control circuit of FIG. 1.

FIG. 1 depicts in simplified form an automatic gain control circuit which illustrates the principles of the invention. A burst signal to be stabilized in amplitude is supplied to amplifier 10 via input terminal 11. Amplifier 10 may be any of the numerous ones known in the art having controllable gain capability. For example, a National Semiconductor ML–170 Type Amplifier is one such device. Alternatively, a controllable impedance element may be utilized in conjunction with an operational amplifier to provide a controllable gain device in a manner well known in the art. One such variable gain circuit is described in my U.S. Pat. No. 3,408,588 issued Oct. 29, 1968. The AC output signal developed in amplifier 10 is supplied to trigger circuit 12 wherein unidirectional pulsating signal having a duty cycle proportional to the amplitude of the AC signal is developed. The pulsating signal is supplied to capacitor 22 via diode 20 and resistor 21 to generate automatically a DC voltage for controlling the gain of amplifier 10. Diode 20 prevents capacitor 22 from discharging through circuit path 14 during the intervals between burst signals. Control circuit 30 is used in accordance with the invention to control selectively the amplitude of the DC control voltage developed across capacitor 22 in accordance with a preestablished criterion. Details of control circuit 30 are shown in FIG. 2 to be described below.

Figure 3A:
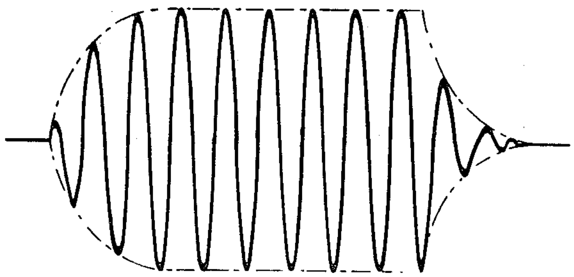
FIGS. 3A through 3E depict waveforms useful in describing the invention.
Figure 3B:
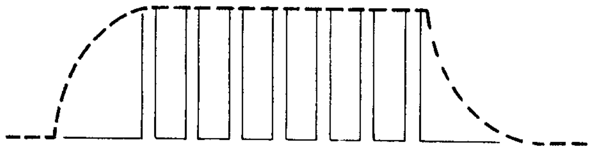

In operation of the automatic gain control circuit of FIG. 1 a pulse burst signal similar to the one shown in FIG. 3A is supplied to input terminal 11 and, hence, amplifier 10. In a properly functioning system, the output signal developed in amplifier 10 is essentially identical to the input for amplitude scaling. Thus, the output signal from amplifier 10, essentially identical to the signal shown in FIG. 3A, is supplied to trigger circuit 12. Trigger circuit 12 may be a Schmitt trigger circuit or any of the other threshold gating circuits known in the art, which switches to a first stable state whenever the applied input signal crosses a predetermined threshold level in a first direction and switches to a second stable state whenever the applied input signal crosses the predetermined threshold in a second direction. The output pulsating signal developed in trigger circuit 12 is shown in FIG. 3B.

Use of a Schmitt trigger as shown in FIG. 1 improves the response of the AGC circuit to correct variations in the burst signal amplitude. This is accomplished in the present circuit by selectively setting the threshold level of trigger circuit 12. It is well known that the threshold level of a Schmitt trigger circuit can be adjusted so that relatively small amplitude changes in the applied signal cause relatively large changes in the duty cycle of the Schmitt trigger output waveform. Ordinarily, this is achieved by setting the trigger threshold to a level approximately equal to but slightly less than the desired peak amplitude of the burst signal. Details of operation of such a Schmitt trigger circuit are described in my U.S. Pat. No. 3,408,588 cited above.

Figure 3C:
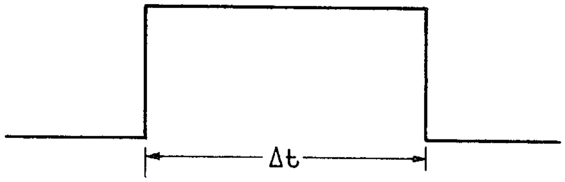

The pulsating output from the trigger circuit 12 is supplied to diode 20 via circuit path 14, to control circuit 30 via circuit path 15 and to terminal 16. The pulsating output available at terminal 16 may be used, for example, to determine a timing interval as shown in FIG. 3C. Thus, it is apparent that each timing interval of successive burst signals must be accurately reproduced. This is effected in accordance with the present invention by accurately controlling the amplitude of the received burst signal so that trigger circuit 12 responds to generate pulsating signals only after the burst signal has reached a predetermined amplitude. Typically, the threshold of trigger circuit 12 is set at a predetermined level which is greater than the anticipated amplitude during the "rise" and "fall" portions of the received signal. This eliminates use of the rise and fall portions for gain control and, hence, minimizes errors possible by the illusion of detecting a low signal amplitude.

Figure 3D:
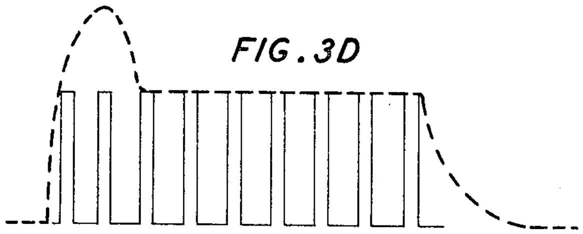
Figure 3E:
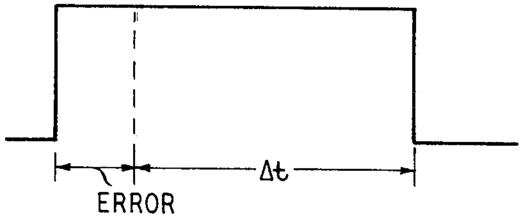

Another problem in AGC circuits is gain adjustment error caused by a decrease or variation in the DC gain control voltage during the intervals between burst signals. Since these intervals may vary in different systems from microseconds to seconds or even minutes, it is readily seen that capacitor 22(FIG.1) could possibly discharge unless precautions are taken. Such an unwanted and uncontrolled discharge of capacitor 22 could create the illusion of low signal amplitude. This would cause an increase in circuit gain as illustrated in FIG. 3D in dashed outline. Such a gain change would cause a corresponding increase in the received signal amplitude, and, hence, would cause the threshold of trigger circuit 12 to be exceeded prematurely. As depicted in FIG. 3D, an error in the pulsating output signal developed in trigger circuit 12 would result. Consequently, the timing interval to be measured would be distorted in the manner shown in FIG. 3E.

A possible solution to this problem would be to make the time constant of the discharging path for capacitor 22 (FIG. 1) very large. But, as is well known in the AGC art, the control voltage level developed across capacitor 22 must be able to vary rapidly in response to changes in the output signal amplitude of amplifier 10. Otherwise, the desired control over the amplitude of the received signal is not achieved. Thus, the charging and discharging time constants of capacitor 22 must be selected to allow the desired rapidity of gain control variation. This, however, conflicts with the need for a very long discharging time constant in systems used for controlling the amplitude of pulse signals, burst signals and the like.

This problem is overcome, in accordance with the invention, by selectively supplying a discharging path for capacitor 22 for a predetermined interval only after each of the pulses developed in trigger circuit 12. Control circuit 30 provides the required discharge path. Thus, an appropriate charging time constant for capacitor 22 is set by selecting the component values of resistor 21 and capacitor 22. Similarly, the discharge time constant for capacitor 22 is set by selecting an appropriate value for resistor 23. Since control circuit 30 does not supply a discharge path for capacitor 22 during the no-signal intervals of the received signals, the gain level of amplifier 10 will remain constant between successive signals. Upon receiving the next signal, the gain of the circuit will be adjusted within the first or second pulse from trigger circuit 12. Hence, undesired gain variations are eliminated.

FIG. 2 shows details of one circuit which may be utilized in the practice of the invention for selectively controlling the discharge of capacitor 22. Control circuit 30 as shown is basically a monostable multivibrator. Transistors 40 and 41 are the normal monostable switching transistors. Timing of the monostable or unstable interval of the multivibrator is determined partly by the component values of resistor 45 and capacitor 46, In operation, transistor 40 is normally ON and transistor 41 is normally OFF. Thus, normally there is no discharge path for capacitor 22. Control circuit 30 is triggered to provide a discharge path for capacitor 22 by the trailing edge of each of the pulses developed in trigger circuit 12. This is accomplished by supplying the pulsating output from trigger circuit 12 via circuit path 15 to a differentiator circuit including capacitor 50 and resistor 51. Diode 52 blocks the positive output from the differentiator and supplies only the negative going output from the differentiator to the base of transistor 40. Negative pulses cause transistor 40 to turn OFF and, consequently, transistor 41 to turn ON. Accordingly, control circuit 30 responds to supply a discharge path to capacitor 22 (FIG. 1) for a predetermined interval only after termination of each of the individual pulses supplied from trigger circuit 12.

The above-described arrangements are, of course, merely illustrative of the application of the principles of this invention. Numerous other arrangements may be devised by those skilled in the art without departing from the spirit or scope of the invention. For example, any of the numerous controllable switching devices known in the art could be employed to provide a discharge circuit path for selectively adjusting the amplitude of the gain control signal.

What is claimed is:

1. In an automatic control system, which includes a circuit having a controllable gain characteristic, a circuit for developing a gain control voltage which comprises, a trigger circuit having an input and an output said trigger circuit having a predetermined trigger threshold level and being responsive to an applied signal for generating a pulsating signal having a substantially constant amplitude and a duty cycle proportional to the amplitude of said applied signal, means in circuit relationship with the output of said trigger circuit for developing a control voltage having an amplitude proportional to the duty cycle of said pulsating signal, and switching means in circuit relationship with said control voltage developing means and the output of said trigger circuit for selectively supplying a discharge path to said control voltage means for a predetermined interval only after the termination of each pulse of said pulsating signal to adjust the amplitude of said control voltage.

2. A circuit as defined in claim 1 wherein said control voltage developing means includes a capacitor having a predetermined capacitance value and a serial connection of a unidirectional conduction element and resistor means having a predetermined resistance value, said serial connection being in circuit with the output of said trigger circuit and said capacitor, and wherein said discharge path has a predetermined time constant.

3. A circuit as defined in claim 2 wherein said switching means includes a monostable multivibrator responsive to the trailing edge of each pulse of said pulsating signal.

4. A pulse burst signal automatic gain control circuit which comprises, an amplifier having a controllable gain characteristic for stabilizing the amplitude of an applied burst signal, a trigger circuit having an input and an output the input of said trigger circuit being in circuit relationship with said amplifier, said trigger circuit having a predetermined threshold level and being responsive to said burst signal for generating a pulsating signal having a substantially constant amplitude and a duty cycle proportional to the amplitude of said burst signal, means in circuit relationship with the output of said trigger circuit for developing a control voltage having an amplitude proportional to the duty cycle of said pulsating signal, means for supplying said control voltage to said amplifier for controlling the gain of said amplifier, and controllable switching means in circuit relationship with said control voltage developing means and responsive to said pulsating signal for selectively supplying a discharge path to said control voltage developing means for a predetermined interval in accordance with a predetermined criterion related to individual pulses of said pulsating signal to adjust the amplitude of said control voltage.

5. A circuit as defined in claim 4 wherein said control voltage developing means includes a capacitor.

6. A circuit as defined in claim 5 wherein said controllable switching means includes a monostable multivibrator responsive to said pulsating signal to supply a discharge path for said capacitor in accordance with said predetermined criterion.

7. A circuit as defined in claim 6 wherein said multivibrator includes a normally ON transistor and a normally OFF transistor, each having collector, emitter and base terminals, said collector terminal of said normally OFF transistor being connected in circuit relationship with said capacitor means for supplying a discharge circuit path to said capacitor for a preestablished interval.

8. A circuit as defined in claim 7 further including means for triggering said monostable multivibrator only at the trailing edge of each pulse of said pulsating signal.

9. A circuit as defined in claim 8 wherein said control voltage developing means further includes unidirectional conduction means and resistor means forming a unidirectional charging path for said capacitor having a predetermined time-constant and wherein said discharge path includes resistor means to establish a predetermined discharge time-constant.

* * * * *